(No Model.) 2 Sheets—Sheet 2.
F. C. WHITNEY.
STAGE APPLIANCE.
No. 473,986. Patented May 3, 1892.
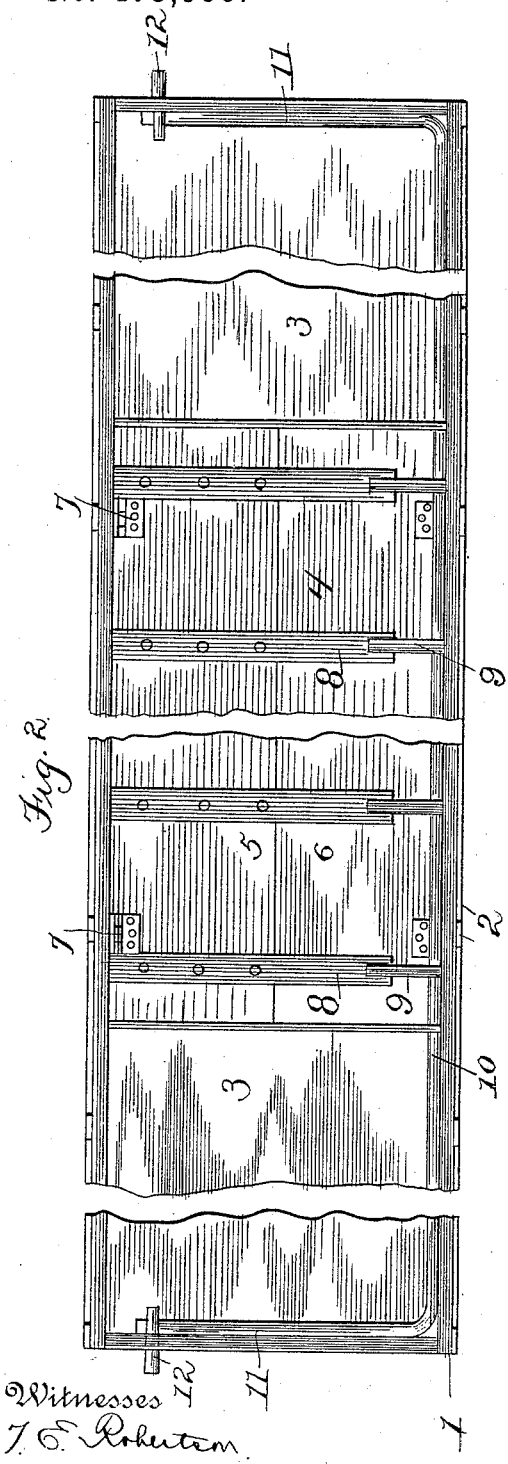
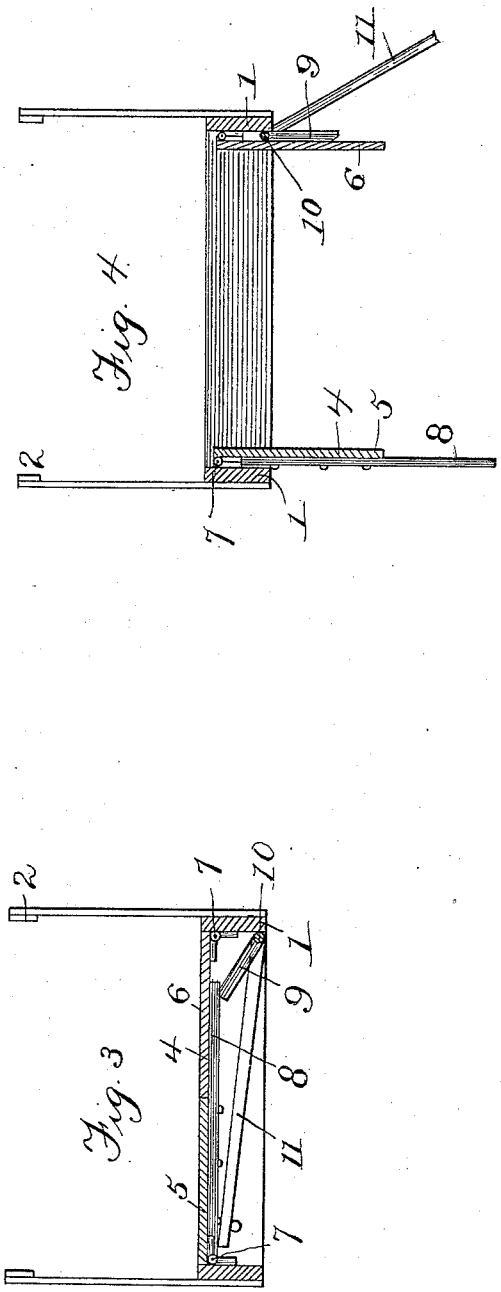
Witnesses
J. E. Robertson
T. Ernest.
Inventor
Fred C Whitney
By T. J. W. Robertson
Attorney
THE NORRIS PETERS CO., PHOTO-LITHO., WASHINGTON, D. C.

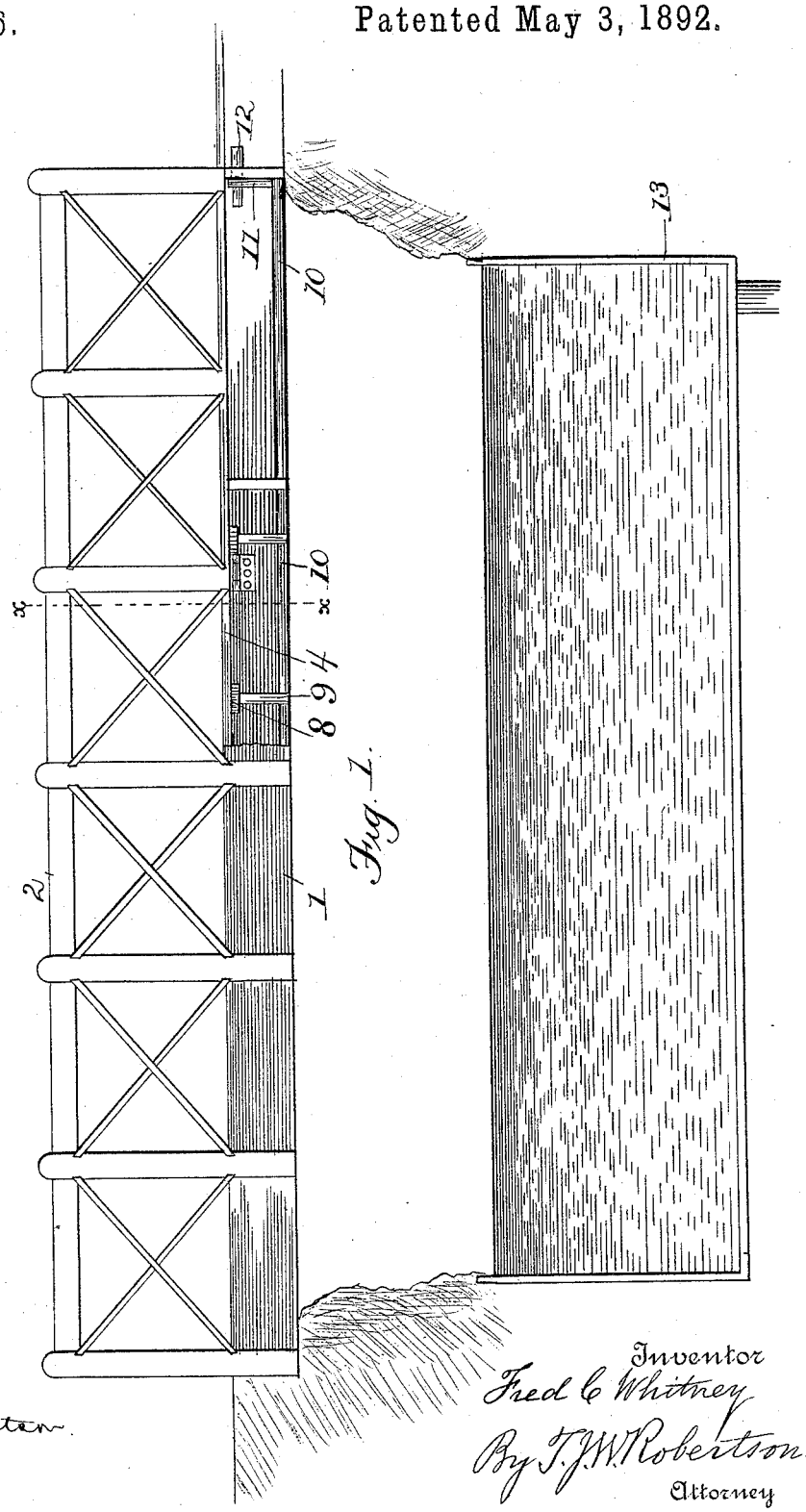

UNITED STATES PATENT OFFICE.

FRED C. WHITNEY, OF DETROIT, MICHIGAN.

STAGE APPLIANCE.

SPECIFICATION forming part of Letters Patent No. 473,986, dated May 3, 1892.

Application filed August 1, 1891. Serial No. 401,339. (No model.)

*To all whom it may concern:*

Be it known that I, FRED C. WHITNEY, a citizen of the United States, residing at Detroit, in the county of Wayne and State of Michigan, have invented certain new and useful Improvements in Stage Appliances, of which the following is a specification, reference being had therein to the accompanying drawings.

This improvement relates, mainly, to a bridge for theatrical scenery, in which a trap is provided for use in situations where a trap may be required, and, secondly, in certain details of construction and arrangement of parts whereby the main feature of my invention is carried out.

In the accompanying drawings, Figure 1 represents a side view of my bridge with parts broken away, the better to show the construction. Fig. 2 is a bottom plan. Fig. 3 represents a transverse vertical section through the line x x in Fig. 1 with the trap closed. Fig. 4 is a similar view with the trap open.

Referring now to the details of the drawings by figures, 1 represents the main beams or supports of the bridge, from which rises the side or guard railing 2, preferably made of rustic form. Supported on the beams at each end are boards or planks 3, firmly secured thereto, and in the center is shown a trap 4, consisting of two doors 5 and 6, one being hinged to each beam, as shown at 7. Attached to one of the doors 5 are battens 8, which are long enough to extend under the other door 6 and rest on a series of arms 9, extending from a shaft 10, running along the whole length of the bridge and provided at one or both ends with a long arm or lever 11, beneath the extremity of which is a pin 12, which supports the lever, and thus keeps the arms 9 in their raised position to support the trap when closed.

As now used by me, the bridge is set above a tank of water 13, representing a river or creek, and in the course of a performance one of the characters rides on horseback across the bridge in safety and is followed shortly by another character, also on horseback. To prevent the latter crossing, his opponents endeavor to cut down the bridge and succeed in weakening it so that the horse falls through into the water below, but the rider clings to the railing, and thus saves himself. This effect is accomplished by pulling out the pin or pins 12 from beneath the lever or levers 11, and thus allowing the horse to drop through the trap into the water below, while the rider jumps from the horse and clings to the side railing, thereby producing a very realistic and thrilling sensational scene that is everywhere received with thunderous applause.

The bridge should of course be supported in such a manner as to allow of the concealing of the man who withdraws the pin 12, that supports the lever.

I do not wish to be understood as limiting myself to the details of construction shown, nor to any particular position of the bridge, nor to its use only in the way described, as such a bridge and trap may be constructed, arranged, or employed in various ways not herein described without departing from the spirit of my invention.

I prefer to use a wooden pin under one of the levers and a metal one under the other, and the latter is withdrawn as soon as the first rider has crossed, leaving the trap supported by the wooden pin, which is only strong enough to support the weight of the trap, and as the horse runs on the trap his weight is sufficient to break the pin and the trap then falls.

Any style of side rails may be employed, of course; but as a rule I prefer to make the railing and beam of such form that the whole will form a trussed girder.

I am aware that traps have been and are in frequent use upon the stage; but such traps are supported on the floor beneath the stage and have never to my knowledge been made in a bridge.

I deem it important that the supports for the trap should all be connected with the bridge, as it leaves the space beneath the bridge free and unobstructed for the fall of the horse in the water, besides heightening the scenic effect and making the same more realistic.

Besides heightening the sensation, the tank of water below the bridge is useful in preventing injury to the horse when falling.

What I claim as new is—

1. A bridge for stage-scenery independent of the stage and provided with a trap, substantially as and for the purpose specified.

2. A bridge for stage-scenery, provided with a trap, supported in its closed position by attachments on said bridge, substantially as described.

3. A trap for stage use, comprising a falling door 5 and a horizontal shaft 10, having arms 9 for the support of the trap-door, and fastening means, as the lever 11 and pin 12, substantially as described.

4. A bridge for stage-scenery, provided with a trap having a clear unobstructed space beneath said trap, substantially as described.

5. A bridge for stage-scenery, provided with a trap supported by the beams of the bridge, substantially as described.

6. A bridge for stage-scenery, provided with a trap supported and concealed from the audience by means of the bridge, substantially as described.

7. A bridge for stage-scenery, provided with a trap supported by the beams of the bridge, and means for tripping the trap near the end of the bridge, substantially as described.

8. The combination, in a stage appliance, of a bridge, a trap therein, and a tank adapted to contain water to receive the horse as it falls through the trap, substantially as described.

In testimony whereof I affix my signature, in presence of two witnesses, this 31st day of July, 1891.

FRED C. WHITNEY.

Witnesses:
T. J. W. ROBERTSON,
THOS. E. ROBERTSON.